Feb. 7, 1967

R. E. BIEHL 3,302,568

CONCATENATED SERIES OF PROPELLANT CHARGES

Filed Dec. 27, 1962

INVENTOR.
RICHARD E. BIEHL

BY Raymond P. Wallace

AGENT

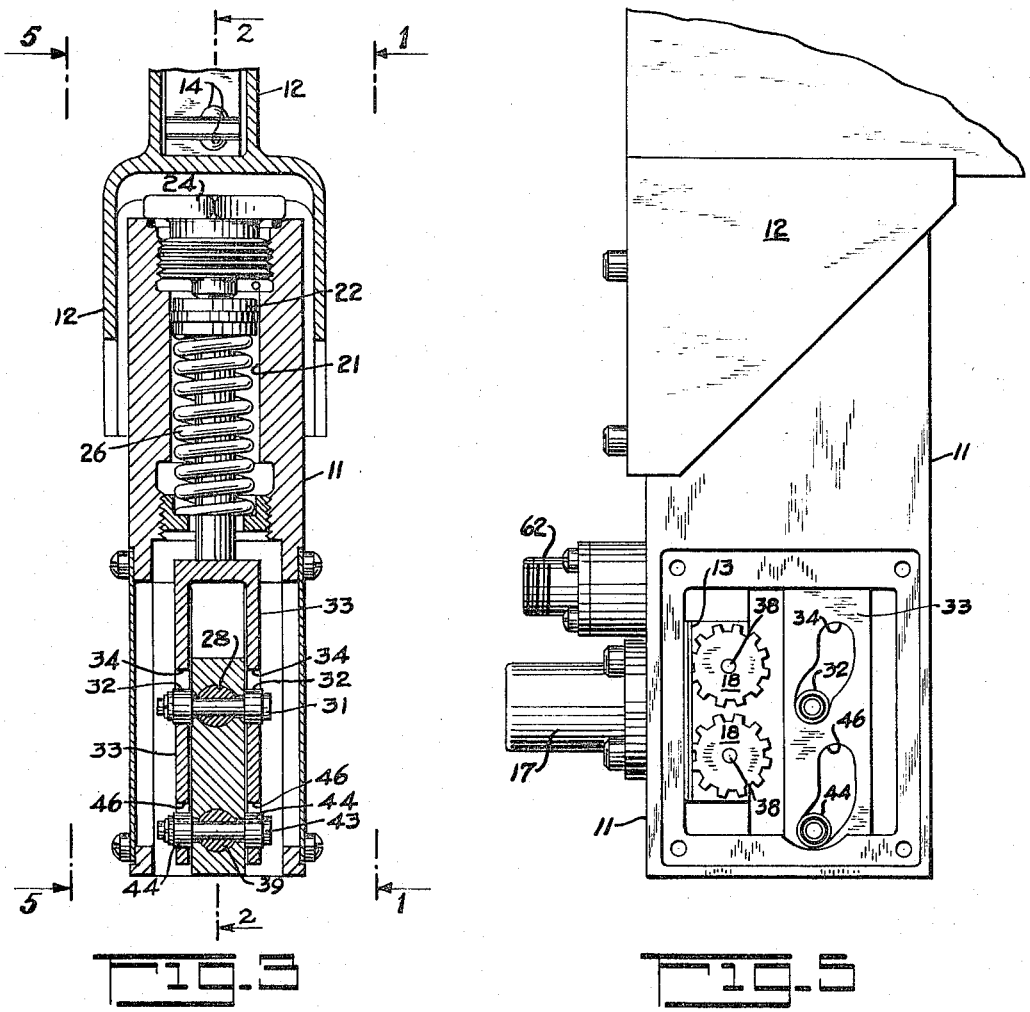

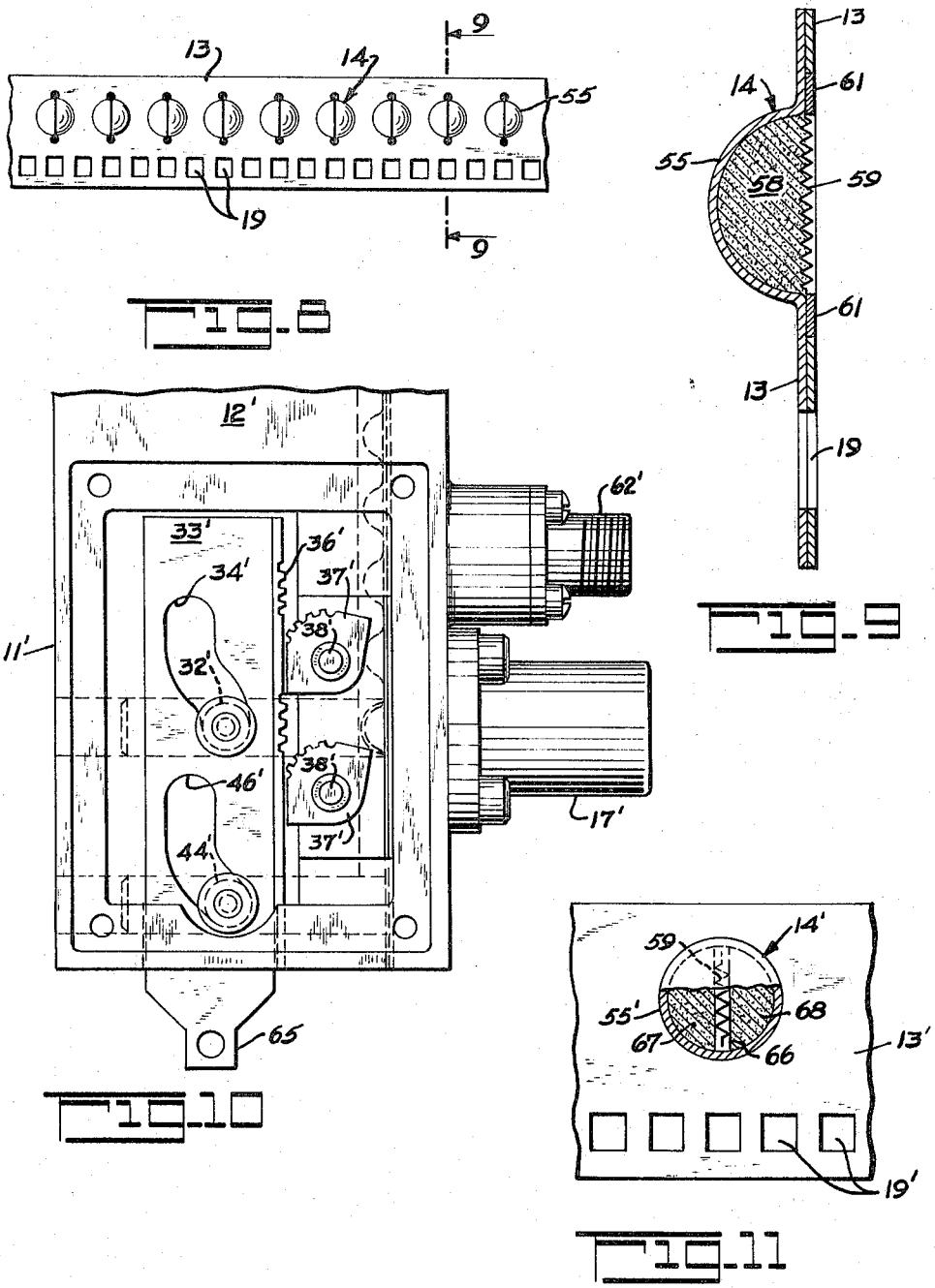

United States Patent Office
3,302,568
Patented Feb. 7, 1967

3,302,568
CONCATENATED SERIES OF PROPELLANT CHARGES
Richard E. Biehl, Pearl River, N.Y., assignor to Curtiss-Wright Corporation, a corporation of Delaware
Filed Dec. 27, 1962, Ser. No. 247,671
1 Claim. (Cl. 102—34.5)

This invention relates to attitude control of space vehicles, that is, the orientation of the axes of a vehicle in inertial space, and more particularly to a method and apparatus for altering the position of the axes of a vehicle in space by the application of discrete increments of reaction force.

The need for attitude control of a spacecraft or missile may arise simply from the necessity to prevent tumbling or spinning, or it may arise from the orientation requirements of devices such as cameras, solar panels, directional antennas, navigational equipment, or other apparatus for sensing radiation. Attitude control may also be necessary to orient the main thrust vector preparatory to a maneuver.

To meet widely varying attitude control requirements the system must be capable of delivering large total impulses for gross changes in vehicle attitude (slewing operations), and very small total impulses for minor orientations. Previously, these requirements have not been generally compatible with a design utilizing a single thrust chamber. If the chamber is sized to meet the requirements of gross attitude changes, it is usually too large to serve for fine orientation, and conversely, if it is small it requires excessive time periods for large angular displacements.

Liquid fuel rocket engines attempt to satisfy such a dual requirement by sizing the engine for large displacement, and then depending on fast acting solenoid valves for small increments. However, when prolonged space missions are considered, liquid propellant introduces serious problems, such as the storability of the liquids over long periods, and the long-term compatibility of the liquids with their containers and pressurizing systems.

It has also been attempted to use solid fuel rocket engines having a single fuel body, sizing the engine for large angular displacement, and pulsing it intermittently to procure minute movements for limit cycle operation. This method encounters the difficulty of start-stop operation of a single fuel body in a solid propellant motor, and even when this can be done, it appears that the start and stop response time of solid propellant is not adequate. There is also the further difficulty that the thrust produced by a solid propellant engine burning a single fuel body varies with the area of exposed fuel during burning.

The present invention solves these problems by the use of discrete, minimum impulses from pellets of solid fuel which can be fired either singly or in rapid bursts of the necessary number to provide the required total thrust. This operation is accomplished by providing a plurality of small, lightweight, plastic capsules of solid propellant bonded to a tape or similar flexible member. A transport mechanism carrying the tape feeds each capsule successively to a firing chamber, where the propellant is fired, rupturing and partially burning the enclosing plastic membrane, the exhaust gases being discharged through a nozzle to produce reaction thrust. The transport rate is variable, and the capsules may be fired singly or in continuing bursts.

It is therefore a primary object of this invention to provide a means of orienting a vehicle in space.

It is another object of the invention to provide means adapted to fine or gross orientation of a space vehicle.

It is a further object to orient a space vehicle by means of discrete reaction pulses.

Yet another object is to provide a continuous concatenated series of encapsulated solid fuel pellets.

Still another object is to provide a transport system for feeding a series of fuel pellets to a firing chamber.

Other objects and advantages will become apparent on reading the following specification in connection with the accompanying drawings, in which FIGURE 1 is a side elevational view of the device, with a cover plate removed;

FIGURE 3 is an elevational cross-section taken on line 3—3 of FIGURE 2;

FIGURE 4 is a plan cross-section taken on line 4—4 of FIGURE 2;

FIGURE 5 is a view similar to FIGURE 1, taken from the opposite side;

FIGURE 8 is a surface view of the tape bearing encapsulated explosive charges;

FIGURE 9 is an enlarged cross-section of the tape taken on line 9—9 of FIGURE 8;

FIGURE 10 is a view similar to FIGURE 1, of a modified embodiment; and

FIGURE 11 is an enlarged plan view, partially broken away, of a modified embodiment of the encapsulated charge.

Figure 1:
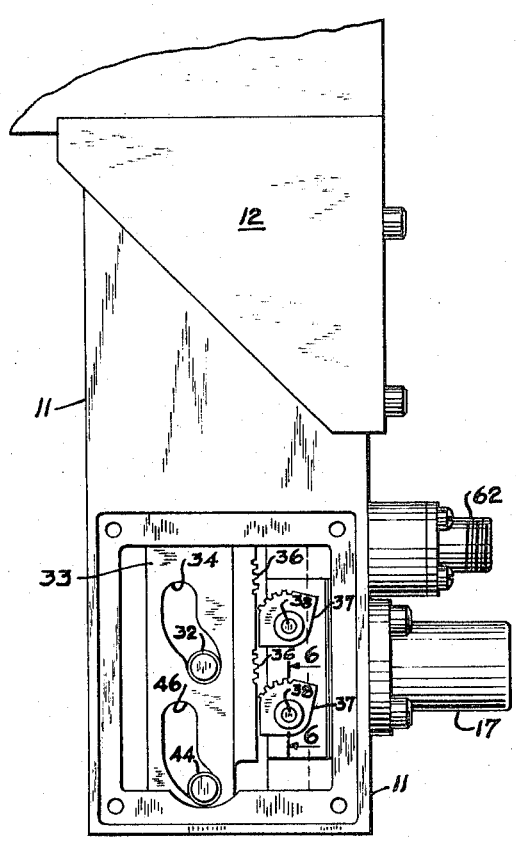
Figure 2:
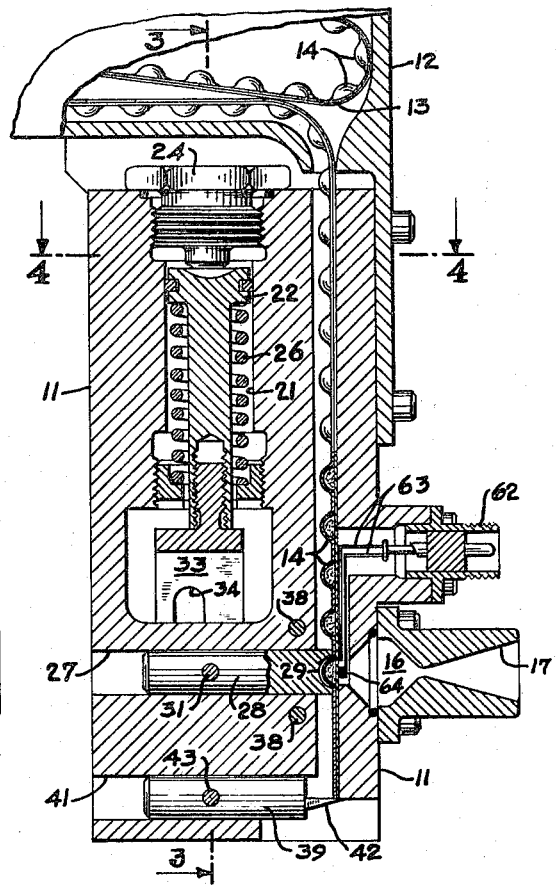
FIGURE 2 is a similar view in cross-section taken on a median plane, as indicated by line 2—2 of FIGURE 3.

Referring more specifically to the drawings, there is shown a housing member 11 of suitable configuration for containing and positioning the various elements hereinafter to be described. A magazine 12 (shown in fragment only) is provided, attached to the housing and communicating with the interior thereof, and containing a supply of tape 13 bearing encapsulated explosive or propellant charges 14. The tape may be advanced intermittently to position each capsule adjacent the firing chamber 16 communicating with discharge nozzle 17. As each capsule comes into position adjacent to the firing chamber, it is fired electrically before the next capsule is advanced.

The tape 13 is advanced by a pair of sprocket wheels 18 mating with sprocket apertures 19 in the tape, the sprocket wheels being actuated as follows. A cylinder 21 is formed in the upper portion of housing 11, containing a piston 22 adapted to be driven downward by a portion of the gas from each explosion, acting on the piston head through apertures 23a, 23b, and 23c forming a conduit for gas, communicating between the firing chamber and the cylinder 21 at a location above the piston head. The top of the cylinder above the piston is provided with a closure such as gland 24 or other suitable means. A spring 26 is provided under the piston head to return it to rest position in the upper part of the cylinder, as shown. It will be understood that when such positional terms as upper, lower, front, rear, etc. are used herein, they refer only to the position of the device as shown in the drawings, since during operation in space such directional concepts have no meaning. For descriptive purposes, the portion of the device bearing the magazine will be referred to as the upper end, and the opposite end as the lower; the discharge nozzle will be regarded as positioned on the front of the device, with the opposite side being described as the rear.

A boltway 27 is formed in housing 11 coaxial with nozzle 17, a reciprocating bolt 28 being disposed in the boltway. The front end of bolt 28 is provided with a recess 29 of suitable size and shape to mate with capsules 14, substantially hemispherical as shown; however, it will be understood that the capsules may be of any desired shape, thus governing the shape of the recess. The function of bolt 28 is to hold the capsules firmly during firing to the aperture of the firing chamber communicating with the nozzle, and to provide backing so that the thrust of the explosion is applied to the device.

A pin 31 extends transversely through bolt 28 and bears a cam-roller 32 on each end. The lower end of piston 22 bears a vertically positioned clevis 33 straddling the bolt 28 and having a cam-slot 34 in each leg mating with cam-rollers 32 in operating relationship thereto. Housing 11 is provided with internal slideways in which the clevis reciprocates vertically. As the clevis is driven downward by piston 22 actuated by gas from the explosion of one of the capsules 14, the cam-rollers follow the cam-slots and retract bolt 28 from the firing position, thereby providing clearance for the positioning of a new capsule at the firing position. One of the front edges of the clevis is provided with two series of rack teeth 36, which on the downstroke engage the teeth of gear sectors 37 mounted above each other on one end of transverse axles 38, rotating the gear sectors approximately one-quarter turn (counterclockwise as shown in FIGURE 1). Sprocket wheels 18, engaged with apertures 19 of the tape, are mounted on the opposite ends of axles 38.

Figure 6:
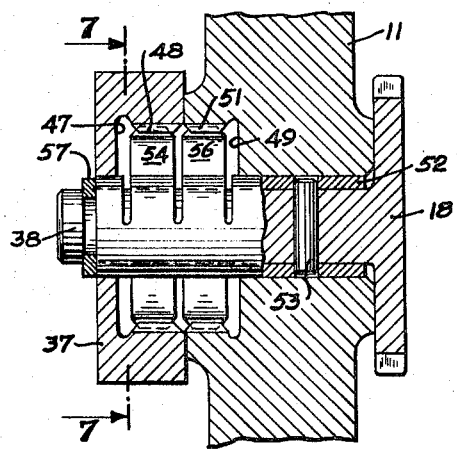
FIGURE 6 is an enlarged fragmentary cross-section, taken on line 6—6 of FIGURE 1.
Figure 7:
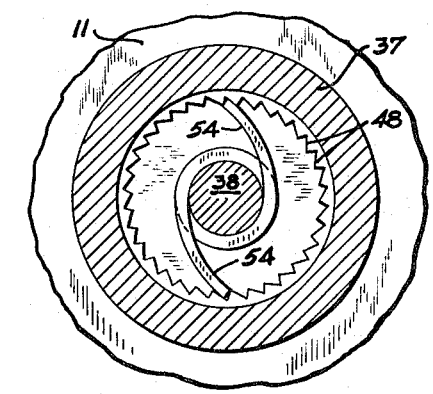
FIGURE 7 is a fragmentary view taken on line 7—7 of FIGURE 6.

FIGURES 6 and 7 are detail views showing the operation of the gear sector and sprocket wheel assembly. Gear sectors 37 are each provided with an internal counterbore 47 concentric with axles 38, facing the housing and having inwardly projecting ratchet teeth 48. The housing 11 is also provided with counterbores 49, facing counterbores 47 and congruent therewith and having similar inwardly projecting ratchet teeth 51. A sleeve 52 surrounds axle 38 and is firmly fixed thereto, as by a pin 53 or other convenient means. Sleeve 52 has projecting tangentially therefrom two pairs of resilient pawls 54 and 56, pairs 54 being disposed in counterbores 47 and mating with teeth 48, and pairs 56 being disposed in counterbores 49 and mating with teeth 51. Gear sectors 37 turn freely on sleeve 52, being retained thereon by snap-rings 57 or similar means.

Thus, when gear sectors 37 are rotated counterclockwise (as shown in FIGURE 1) by rack teeth 36 on the downstroke of the piston, pawls 54 click over ratchet teeth 48 without engaging, and pawls 56 are restrained by ratchet teeth 51, whereby sleeve 52 is prevented from turning and rotating sprocket wheels 18 in a backward direction. On the upstroke of the piston the gear sectors are rotated in a clockwise direction, ratchet teeth 48 thereupon forcing the sleeve through pawls 54 to turn, while pawls 56 click freely over ratchet teeth 51, thus turning the sleeve and the sprocket wheels and advancing the tape 13. It will be apparent that by this means the sprocket wheels 18 can be rotated only in such a direction as to advance the tape and position an unfired capsule 14 in the firing position. It is to be understood that the details of the advancing mechanism need not be precisely as shown and described, but may be any mechanism which will accomplish the same object; for instance, an overrunning clutch might be used rather than the ratchet and pawl arrangement.

It will be observed that the upper portion of cam-slot 34 is vertically oriented, whereby the bolt 28 remains in its retracted position for the first half of the return stroke of the piston and clevis, allowing time for the return stroke of gear sectors 37 acting through the ratchet and pawl means to drive sprocket wheels 18 to advance the tape and position a new capsule before the bolt closes.

A second reciprocating bolt 39 is also provided in a second boltway 41 below and parallel to the first bolt. The front end of bolt 39 has fixed thereto a horizontally disposed knife blade 42 adapted to shear off used increments of tape against the bottom edge of the tape slot in the housing as the fired tape emerges therefrom. Bolt 39 is also provided with a pin 43 extending transversely therethrough, and having a second pair of cam-rollers 44 mounted on the ends of the pin. Cam-rollers 44 are engaged with and actuated by a second pair of cam-slots 46 in the clevis, positioned below the first pair of cam-slots 34, whereby bolt 39 is reciprocated in its boltway with each operation of the piston.

In FIGURE 8 there is shown a portion of the tape bearing the encapsulated charges. Flexible tape 13 is provided, having bonded thereto a series of capsules 14 containing explosive charges. The capsules are spaced lengthwise along the tape at distances matching the linear advance of the tape through the machine, as provided by the sprocket wheels 18 at each stroke of the piston. Apertures 19 are provided in one edge of the tape for engagement with the sprocket wheels, and at distances matching the spacing between the teeth of the sprocket wheels. Any material of suitable strength and thickness may be used for the tape; particularly satisfactory materials are the polyethylene terephthalate resin sold under the trademark Mylar, and a phenolic plastic material reinforced with glass fiber.

FIGURE 9 shows an enlarged cross-section of one of the capsules 14. Each such capsule comprises a shell 55 of a shape adapted to fit the cavity 29 in bolt 28, and containing a charge 58 of explosive propellant. An electrical igniter 59 is also positioned within the shell 55 in contact with the propellant. Electrical leads 61 are connected to the igniter to form a conducting path, and extend through the tape 13 to provide terminals for making electrical contact in the attitude control device when the capsules are in position in the firing chamber. The igniter may be a simple resistance element as shown, or any other element capable of generating sufficient heat by electrical excitation to ignite the propellant material. Likewise, the electrical leads may extend through the tape or the capsule shell at any convenient point.

The shell 55 may be of any convenient material, and would normally be of the same material as the tape. The shells may be separate elements bonded to the tape, or may be molded in another length of tape (as shown in FIGURE 9) which is bonded to the primary tape 13. Epoxy resin is one material which has been found suitable for such bonding. The propellant 58 may be of any suitable explosive material, the choice of which may vary widely according to desired burning characteristics, such as temperature of ignition, burning rate, and thrust or pressure developed. One particular composition which has been successfully used comprises a mixture of potassium perchlorate and rubber, which is moldable into pellets and possesses the necessary storage life in a space environment. The charge of propellant may entirely fill the capsule, or may occupy any desired portion thereof.

An electrical connector 62 of conventional type is attached to the housing at any convenient location, having leads 63 therefrom to provide a conducting path to contacts 64 positioned at the firing chamber and adapted to make electrical connection to terminals 61 of each capsule as it reaches firing position. Any suitable source (not shown) of electrical current may be used to energize the circuit when it is desired to fire a single capsule, or a series.

Turning now to FIGURE 10, there is shown in a view similar to that of FIGURE 1 another embodiment of the attitude control device. In this embodiment the tape and capsules, the advancing mechanism therefor, the discharge nozzle, and the firing circuit are the same as in the previous embodiment. However, the housing 11' is shortened at the top end, since it does not contain the gas-driven piston of the previous embodiment. Instead, the clevis 33' is provided at its lower end with a tongue 65 to which a reciprocating actuating element (not shown), such as a solenoid, for instance, may be connected. In all other respects the embodiment of FIGURE 10 operates the same as the previous embodiment.

Although the invention has been described primarily with reference to encapsulated charges of solid propellant, a mono-propellent liquid may also be encapsulated in the same way and fired in the same manner as solid charges. Further, as shown in FIGURE 11, the invention is suited to encapsulating a plurality of liquids within a single capsule. Such liquids may be a plurality of monopropellants, or may be such liquid components as on admixture produce a suitable fuel to be fired by the igniter, or they may be liquids which on coming together ignite by hypergolic reaction.

A capsule 14′ is provided with at least one internal septum 66 dividing the shell 55 into a plurality of separate hermetically sealed compartments. As shown in FIGURE 11, one compartment or chamber contains one fuel component 67, and another compartment contains another component 68. The igniter 59 is incorporated into the septum and is provided with electrical leads as described in the previous embodiment. When the capsule 14′ reaches the firing position and the igniter is energized, the septum is ruptured by the heat of the igniter and the liquids contact each other. If the liquid components are monopropellants of if they are partial components of a fuel requiring external ignition, they are fired by heat from the igniter. If the liquids are hypergolic components, the heat of the igniter serves to rupture the septum, and the fuel ignites by hypergolic reaction on mutual contact.

Control devices of the type described may be mounted on the periphery of a space vehicle, preferably at either the nose or the stern, for controlling the attitude of the vehicle. If four such devices are disposed ninety degrees apart and adapted to discharge radially with respect to the longitudinal axis of the vehicle, it will be apparent that the longitudinal axis may be oriented in space in any desired direction. With an additional pair of control devices adapted to discharge tangentially with opposing forces, rotation in either direction about the longitudinal axis can be imparted to the vehicle.

Although the invention has been described above in specific embodiments, it will be understood that various modifications may be made by those skilled in the art without departing from the principle of the invention. It is intended to cover all such modifications by the appended claim.

What is claimed is:

A concatenated series of propellant charges for a pulse rocket motor system, comprising in combination a first flexible elongated strip of electrically nonconductive rupturable material, a plurality of discrete fuel propellant charges mounted on said strip in longitudinally spaced series relationship, a second flexible elongated strip of electrically nonconductive material bonded to said first strip and forming therewith domed capsules enclosing said charges between said first and second strips, said first strip having a generally flat exterior surface and said second strip being shaped to form said domed capsules, each of said capsules having an internal heat-rupturable septum dividing said capsule into two compartments, each of said compartments containing a liquid propellant fraction which on contact with the other said fraction causes combustion by hypergolic reaction, each of said capsules containing an electrical resistance element in thermal contact with said septum, each of said capsules having a pair of electrical contacts formed in circuit with said resistance element and borne by said first strip and extending therethrough and having exposed surfaces substantially flush with the exterior surface of said first strip for frictional engagement with external electrodes, whereby when an electrical circuit is completed through said contacts and said resistance element said septum will be ruptured by heat causing contact of said two liquid propellant fractions and consequent combustion thereof to rupture said first strip.

References Cited by the Examiner

UNITED STATES PATENTS

| | | | |
|---|---|---|---|
| 173,675 | 2/1876 | Savoral | 102—86.5 |
| 221,015 | 10/1879 | Backes | 102—86.5 |
| 691,500 | 1/1902 | Stenersen | 60—39.47 X |
| 1,191,299 | 7/1916 | Goddard | 102—34.5 |
| 1,838,984 | 12/1931 | Berkowitz | 60—35.6 |
| 2,172,163 | 9/1939 | Glowka | 60—35.6 |
| 2,207,635 | 7/1940 | Nardone | 60—26.11 |
| 2,396,566 | 3/1946 | Goddard | 102—34.5 |
| 2,403,730 | 7/1946 | MacNeille | 60—26.11 X |
| 2,960,031 | 11/1960 | Clift | 102—40 |
| 3,210,930 | 10/1965 | Leeper et al. | 60—35.6 |
| 3,210,931 | 10/1965 | Elzufon et al. | 102—34.5 X |

BENJAMIN A. BORCHELT, *Primary Examiner.*

CARLTON R. CROYLE, *Examiner.*

W. C. ROCH, *Assistant Examiner.*